(12) United States Patent
Odebrecht

(10) Patent No.: US 6,213,865 B1
(45) Date of Patent: Apr. 10, 2001

(54) WIND PARTITION ARRANGEMENT AND OPEN VEHICLE USING SAME

(75) Inventor: Wolfgang Odebrecht, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/514,853

(22) Filed: Feb. 28, 2000

(30) Foreign Application Priority Data

Feb. 26, 1999 (DE) .............................................. 199 08 499

(51) Int. Cl.⁷ ........................................................ B60H 1/26
(52) U.S. Cl. .............................. 454/151; 165/42; 165/44; 454/159
(58) Field of Search ...................... 454/120, 151, 454/156, 159, 161; 165/42, 43, 44

(56) References Cited

U.S. PATENT DOCUMENTS

| | | | |
|---|---|---|---|
| 1,177,022 | * | 3/1916 | Crist .................................. 454/161 X |
| 2,970,456 | * | 2/1961 | Rice .................................. 454/151 X |
| 4,072,487 | * | 2/1978 | Irwon ................................ 454/151 X |
| 4,401,013 | * | 8/1983 | Ohashi et al. ...................... 454/159 X |
| 5,137,326 | * | 8/1992 | George . |
| 5,738,404 | * | 4/1998 | Stadler et al. . |
| 5,839,774 | * | 11/1998 | Hack et al. . |

FOREIGN PATENT DOCUMENTS 197 00 739    1/1997  (DE) .

* cited by examiner

*Primary Examiner*—Harold Joyce
(74) *Attorney, Agent, or Firm*—Evenson, McKeown, Edwards & Lenahan, P.L.L.C.

(57) ABSTRACT

A wind partition arrangement for two-seat open motor vehicles, such as roadsters or convertibles, has an essentially vertically aligned wind partition which covers the headrest area behind the backrests. A covering part which is essentially horizontally aligned covers the clearance between the wind partition and the rear wall of the vehicle occupant compartment. A heat exchanger is provided through which at least a portion of the air flows which arrives in the headrest area. For the purpose of implementing a wind partition in a compact construction with the advantageous warm air supply to the headrest area without an intervention in the wind partition itself, the covering part is constructed as a function element for guiding air which is connected with the heat exchanger and has two air outlet nozzles which are each assigned to a vehicle seat and which are arranged directly below the wind partition and have an air outflow direction aimed at the headrests.

33 Claims, 8 Drawing Sheets

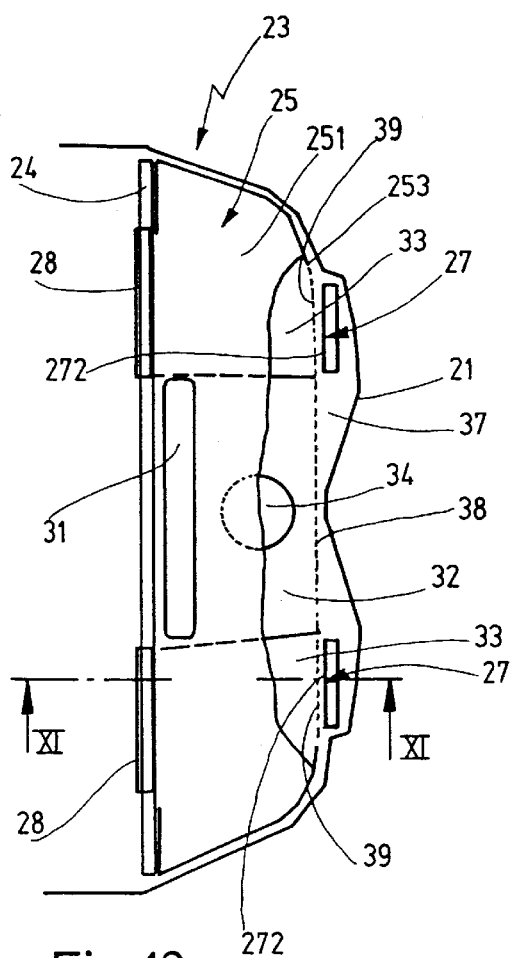
Fig. 13
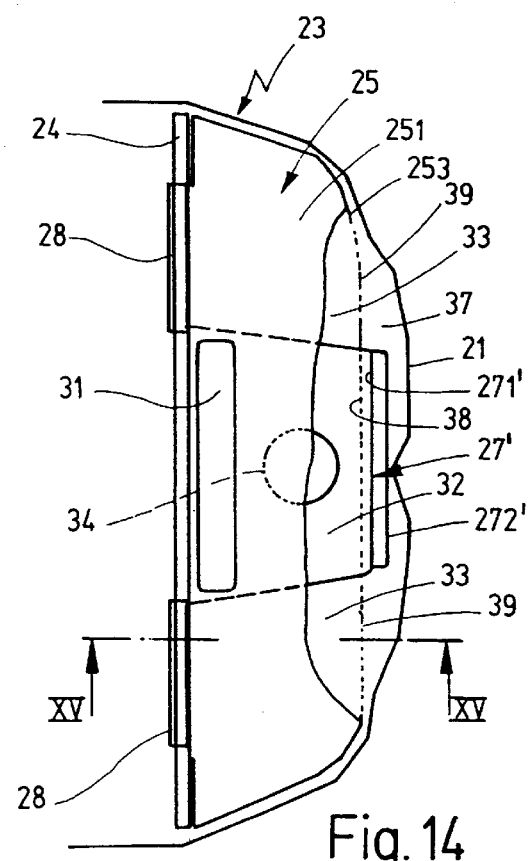
Fig. 14
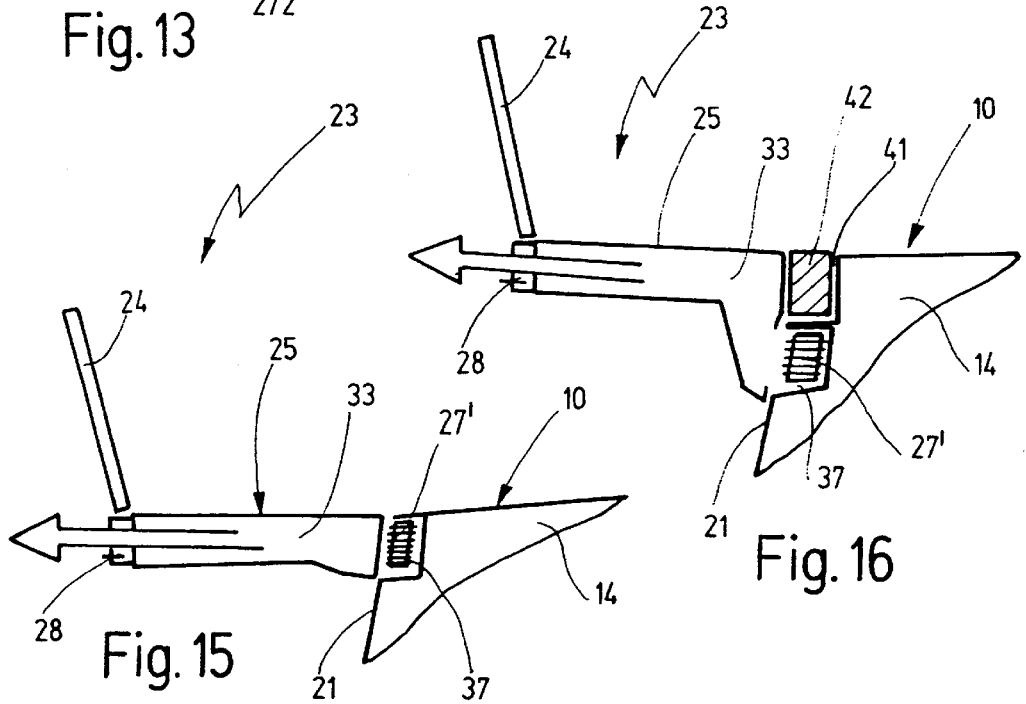
Fig. 15
Fig. 16

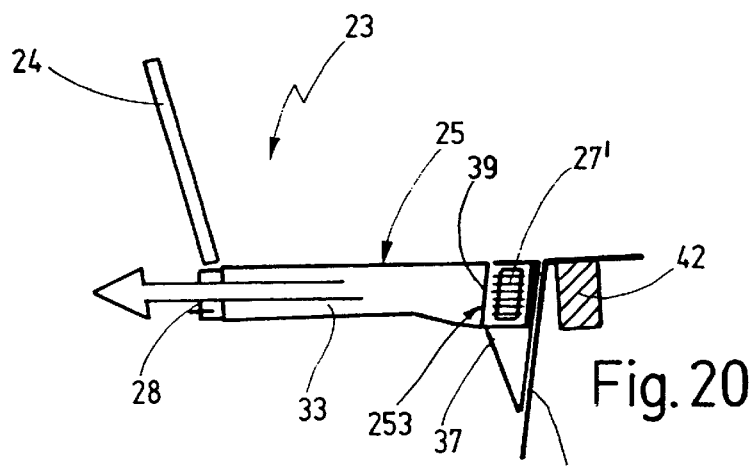
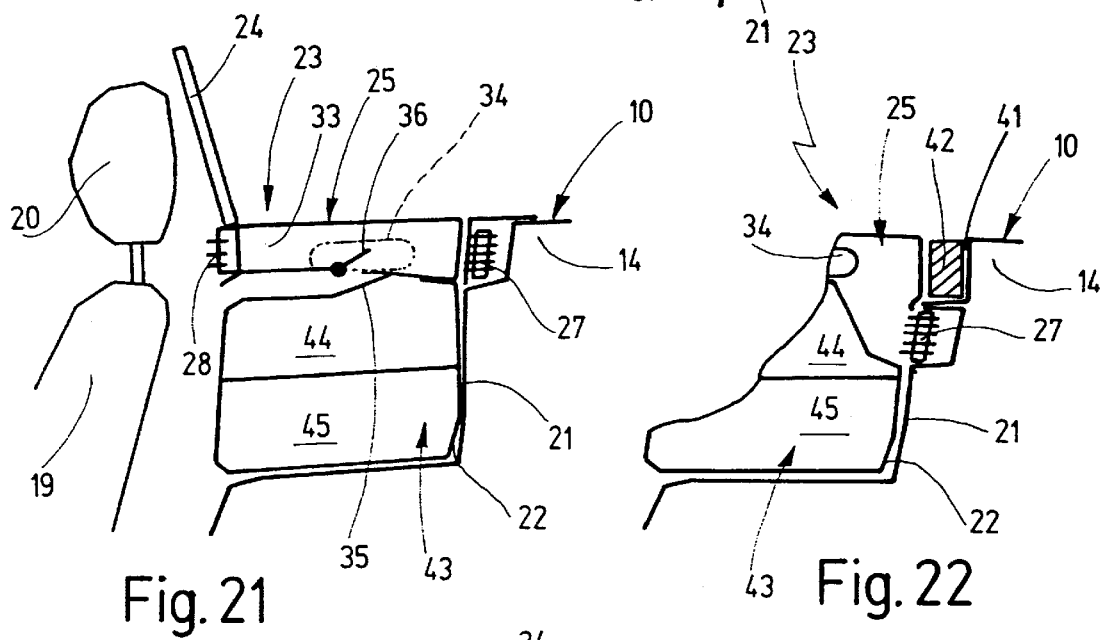
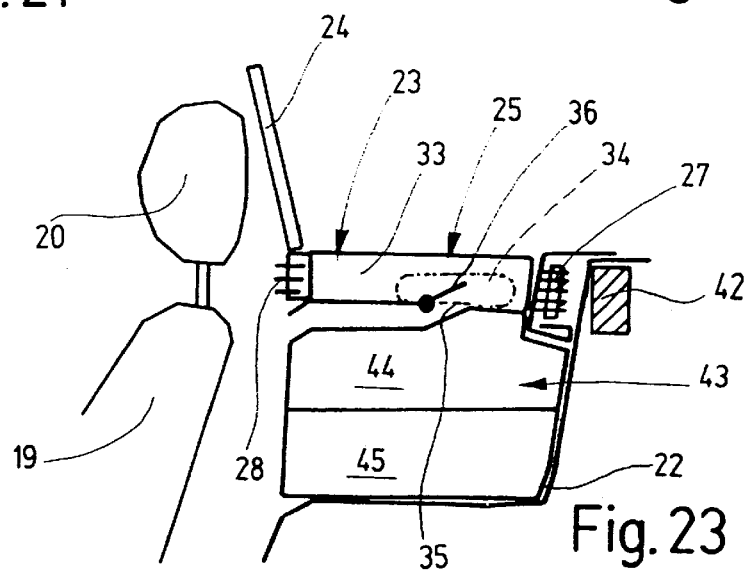

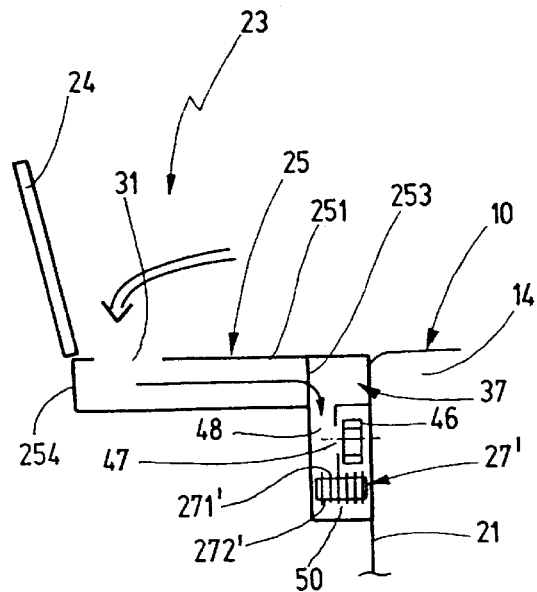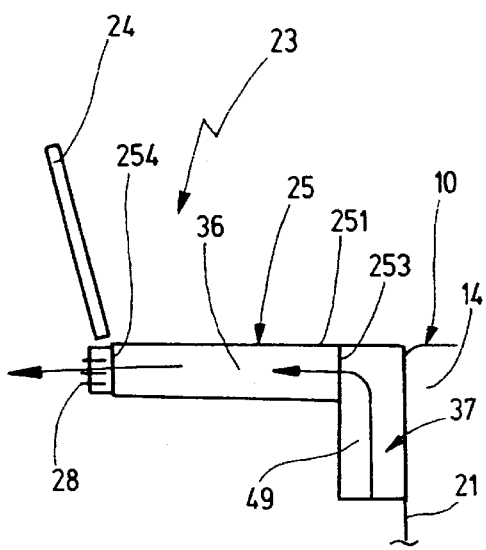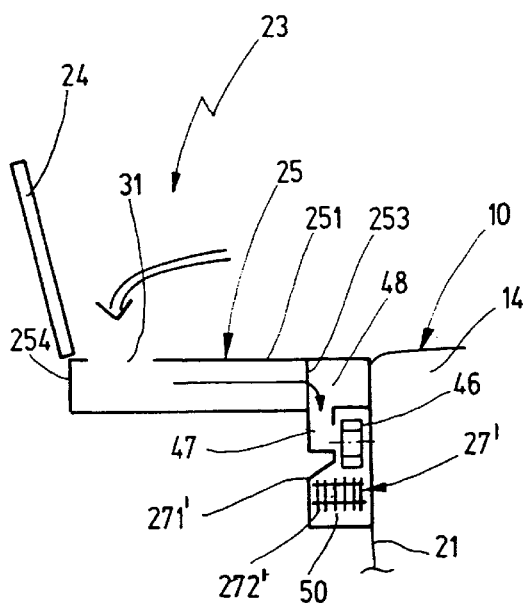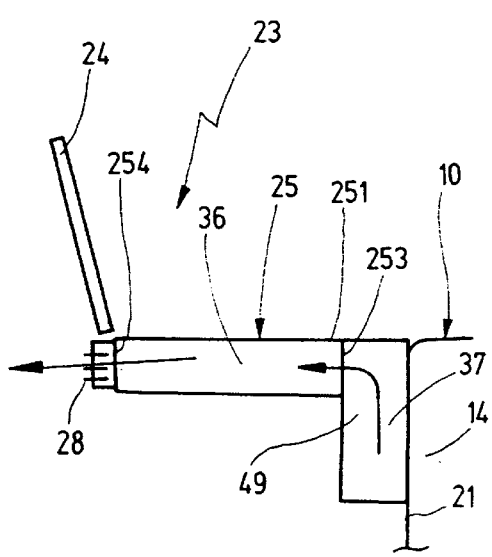

WIND PARTITION ARRANGEMENT AND OPEN VEHICLE USING SAME

BACKGROUND AND SUMMARY OF THE INVENTION

This application claims the priority of German Patent Application 199 08 499.8, filed Feb. 26, 1999, the disclosure of which is expressly incorporated by reference herein.

The invention relates to a wind partition arrangement for two-seat open motor vehicles, such as roadsters or convertibles, having vehicle seats accommodated in a vehicle occupant compartment and arranged side-by-side, each seat having a backrest and a headrest arranged above the backrest, said wind partition arrangement comprising:

an essentially vertically aligned wind partition which covers the headrest area behind the backrests, an essentially horizontally aligned covering part which covers a clearance between the wind partition and a rear wall of the vehicle occupant compartment, and a heating device which has at least one heat exchanger; through which at least a portion of the air can flow which reaches the headrest area.

When driving with an open top, such wind partition arrangements reduce the considerable draft air phenomena in the shoulder and neck region of the vehicle occupants which are caused by the reverse flow of the air stream.

In the case of two-seat motor vehicles, in which a clearance or a rearward space for accommodating an emergency seat or for storing luggage exists between the backrests and the rear wall of the vehicle occupant compartment, the covering part is used for preventing a flow under the wind partition, in order to obtain the maximal effect of the wind partition. In the case of two-seat motor vehicles, in which the backrests directly adjoin the rear wall of the vehicle occupant compartment, this covering part is eliminated because of the non-existent clearance. In both cases, the heating system is used for ventilating the headrest area with warm air and permits, because of the resulting warming of the shoulder and neck region of the vehicle occupants, a driving with an open top also when outside temperatures are relatively low.

In the case of a wind partition arrangement for an open motor vehicle (German Patent Document DE 197 00 739 C1), the flatly designed heat exchanger of the heating system extends directly along a portion of the effective surface of the wind partition provided with net-type openings. In one embodiment, the heat exchanger is integrated in the form of an electric resistance wire mesh into the wind partition; in another embodiment, the flatly constructed heat exchanger, as a rigid structure, is joined in parallel to the wind partition and is connected with the latter by fastening elements. The heat exchanger is either electrically heated or operated by a liquid or gaseous medium in a heat transmission circuit. The heating output is controlled as a function of the driving speed.

It is an object of the invention to ensure a wind partition arrangement of the initially mentioned type in a compact construction with the advantageous warm air supply to the headrest area without an intervention into the wind partition arrangement.

This object is achieved by providing an arrangement of the above described type, wherein the covering part has a function element for guiding air which is connected with the heat exchanger, and has two air outlet nozzles assigned to one vehicle seat respectively, which air outlet nozzles are arranged with an air outflow direction pointing to the headrests, directly below the wind partition.

The wind partition arrangement according to the invention has the advantage that the heating system is not arranged in or i on the wind partition itself but away from the wind partition and therefore does not disturb or interfere with the efforts for obtaining an attractive wind partition design. As the result of the additional utilization of the covering part for the air guidance of the inflow and outflow air to and from the heat exchanger, a space-saving compact module is provided for the draft-free air-conditioning of the shoulder and neck region of the vehicle occupants, which requires little space in the rear compartment, so that sufficient space remains for storing the luggage. The heating system operates dynamically utilizing the reverse flow of the air stream behind the wind partition and requires no separate fan. However, a fan may be provided optionally in order to obtain the heating comfort when stopped or when driving extremely slowly.

Advantageous embodiments of the wind partition arrangement according to the invention with expedient developments and further developments of the invention are described herein and in the claims.

According to an advantageous embodiment of the invention, the covering part has a plate-shaped construction and, in an assignment to one headrest respectively, has two openings situated close to the wind partition, each opening being covered by the air inlet surface of a heat exchanger arranged on the underside of the covering part. An air guiding element, which encloses the heat exchanger, extends to the opening edge and forms one piece with the covering part, is connected with an air outlet nozzle whose air outlet direction points to the assigned headrest.

In an alternative embodiment, the also plate-shaped covering part has only one opening, preferably situated in the center between the headrests on the wind partition, which opening, in turn, is covered by the air inlet surface of a heat exchanger. The two air outlet nozzles are connected by way of a common air guidance element, which encloses the opening edge and preferably forms one piece with the covering part, with the opening and thus with the heat outlet surface of the heat exchanger.

Both embodiments have the advantage that the air taken in behind the wind partition on the basis of the reverse flow of the air stream reaches the air outlet nozzles along the shortest route by way of the heat exchanger.

According to a preferred embodiment of the invention, the covering part is constructed in a hollow box shape and has, in its upper box wall, an air inlet opening preferably arranged in the center between the headrests close to the wind partition. In the box interior, an air inlet duct is constructed which leads to the air inlet surface of the at least one heat exchanger, and two air outlet ducts are constructed which each laterally adjoin the air inlet duct and lead from the air outlet surface of the at least one heat exchanger to one of the two air outlet nozzles respectively. The heat exchanger is integrated either in the box-shaped covering part itself or in a separate housing module which is either an integral component of the rear wall of the vehicle occupant compartment or is arranged as a separate component in the vehicle occupant compartment or is fastened to the rear wall of the vehicle occupant compartment.

The advantage of this constructive embodiment of the invention is the fact that the at least one heat exchanger is accommodated closer to the superstructure or the body of the motor vehicle and is therefore situated in a more protected manner and farther away from the occupant in a safe area with respect to possible crash events of the motor vehicle. As the result of integrated air flaps in the lower box wall, the box-shaped covering part also permits the flowing of air into the rear compartment and thus the heating of the interior in the uncontrolled air operation, for example, after a cold start. Switch off criteria in this case are the control start of the heating or air-conditioning system of the motor vehicle.

Other objects, advantages and novel features of the present invention will become apparent from the following detailed description of the invention when considered in conjunction with the accompanying drawings.

BRIEF DESCRIPTION OF THE DRAWINGS

FIG. 13 is a schematic, partially sectional top view of the wind partition arrangement in FIG. 11;

FIG. 14 is the same schematic representation as in FIG. 13 of a wind partition arrangement modified with respect to FIG. 11;

FIG. 15 is a schematic longitudinal sectional view along the Line XV—XV in FIG. 14;

FIG. 16 is the same schematic representation as in FIG. 15 of a wind partition arrangement modified with respect to FIGS. 14 and 15;

FIG. 20 is a sectional schematic view along Line XX—XX in FIG. 19;

FIG. 21 is a schematic longitudinal sectional view of a wind partition arrangement of a fifth embodiment;

FIG. 22 is the same schematic cutout-type representation as in FIG. 21 of a wind partition arrangement modified with respect to FIG. 21;

FIG. 23 is a schematic longitudinal sectional view of a wind partition arrangement according to a sixth embodiment;

FIG. 24 is a schematic longitudinal sectional view of a wind partition arrangement according to a seventh embodiment;

FIG. 25 is the same schematic representation as in FIG. 20 of the wind partition arrangement in FIG. 24;

FIG. 26 is a schematic longitudinal sectional view of a wind partition arrangement according to an eighth embodiment; and FIG. 27 is the same schematic representation as in FIG. 20 of the wind partition arrangement in FIG. 26.

DETAILED DESCRIPTION OF THE DRAWINGS

Figure 1:
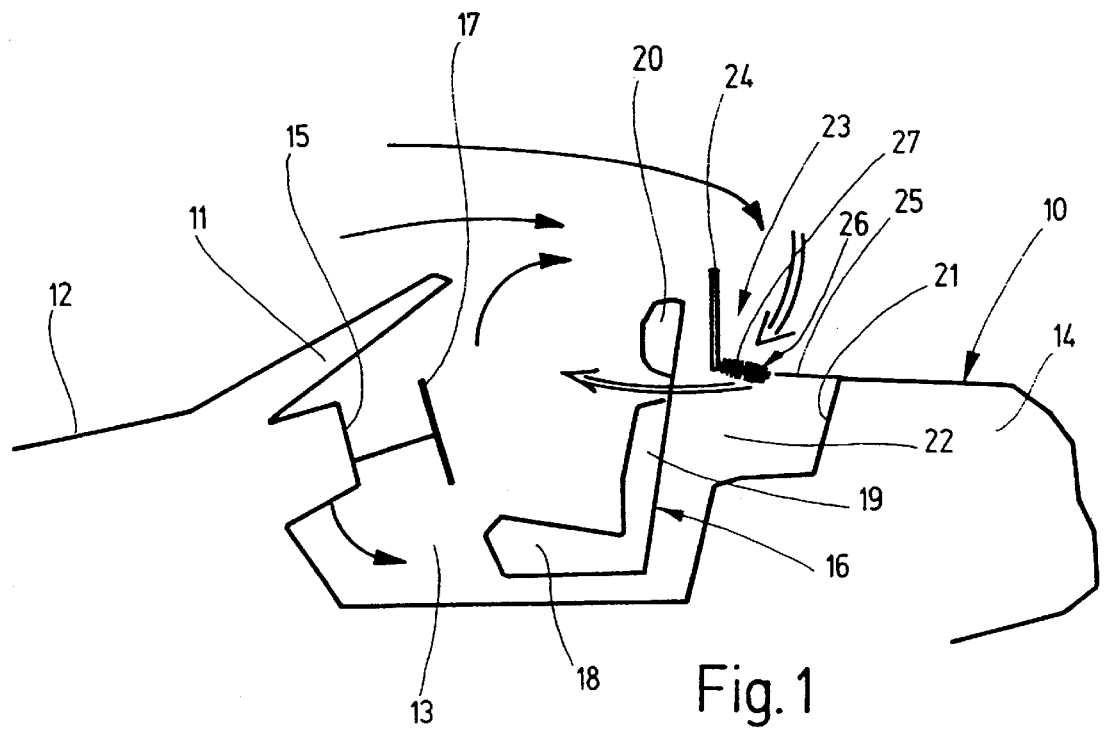
FIG. 1 is a schematic cutout-type longitudinal sectional view of a two-seat convertible with a wind partition arrangement, constructed according to a preferred embodiment of the present invention.

Of the convertible schematically outlined in a cutout-type manner in a longitudinal sectional view in FIG. 1 as an embodiment of an open motor vehicle, the vehicle body 10 is illustrated having a windshield 11, an engine hood 12, a vehicle interior or occupant compartment 13 and a rearward structure 14. On the forward side, the vehicle occupant compartment 14 is equipped with a dashboard 15 and accommodates two vehicle seats 16, of which only the vehicle seat assigned to the steering wheel is visible. Each of the vehicle seats 16 fastened in a longitudinally adjustable manner in the vehicle occupant compartment 13 normally has a seat cushion 18, a backrest 19 and a headrest 20 which is, preferably adjustably, held in the backrest 19. Between a rear wall 21 bounding the vehicle occupant compartment 13 in the rear and the vehicle seats 16 arranged in front of the latter, a rear space 22 exists which is used as an additional storage space for luggage. In some cases, the rear compartment 22 is also equipped with an emergency seat.

In order to compensate the vehicle occupants for the considerable draft air in the head region when driving in an open vehicle, thus when the top of the convertible is folded away, a wind partition arrangement 23 is assigned to the vehicle seats 16. This wind partition arrangement 23 reduces the reverse or return flow of the air stream toward the front into the vehicle occupant compartment 13 which occurs during the drive because of the suction effect, and simultaneously warms the particularly sensitive shoulder and neck region of the vehicle occupants by means of warm air in order to make the driving with an open top more pleasant, particularly at cooler temperatures. The wind partition arrangement 23 consists of the actual, essentially vertically aligned wind partition 24 which is arranged behind the backrests 19 and covers the headrest area, as well as of a covering part 25, which is essentially horizontally aligned and covers the clearance between the wind partition 24 and the rear wall 21 and thus the rear space 22 of the vehicle occupant compartment 13. The covering part 25 extends along the upper edge of the rear wall 21 as well as the vehicle body walls laterally bounding the rear space 22. The covering part 25 prevents a flow under the wind partition 25 by the reverse flow or return flow of the air stream and thereby ensures the maximal effect of the wind partition for the vehicle occupants.

For generating the warm air ventilating the shoulder and neck region of the vehicle occupants, a heating device 26 is provided which has at least one heat exchanger 27 through which the reverse flow of the air stream can flow. In this case, the heat exchanger 27 can be heated electrically or by a gaseous or liquid heat transfer medium. In the embodiment of FIG. 1, an electric heat supply for the heat exchanger 27 is preferred. The wind partition arrangement 23 is constructed to be demountable so that the electric current connection to the heat exchanger 27 has a plug-type construction. A swivellable construction of the wind partition arrangement 23 is also conceivable so that, when it is not in use, it can be swivelled into the rear space 22. In this case, the electric connection lines to the heat exchanger 27 have a flexible construction.

In addition to its function as a covering closing off the rear space 22, the covering part 25 has the function of guiding the warm air and, for this purpose, has two air outlet nozzles 28 each assigned to a vehicle seat 16, one of which in each case being assigned to a headrest 20. With an air outflow direction pointing toward the headrests 20, the air outlet nozzles 28 are arranged directly below the wind partition 24.

Figure 2:
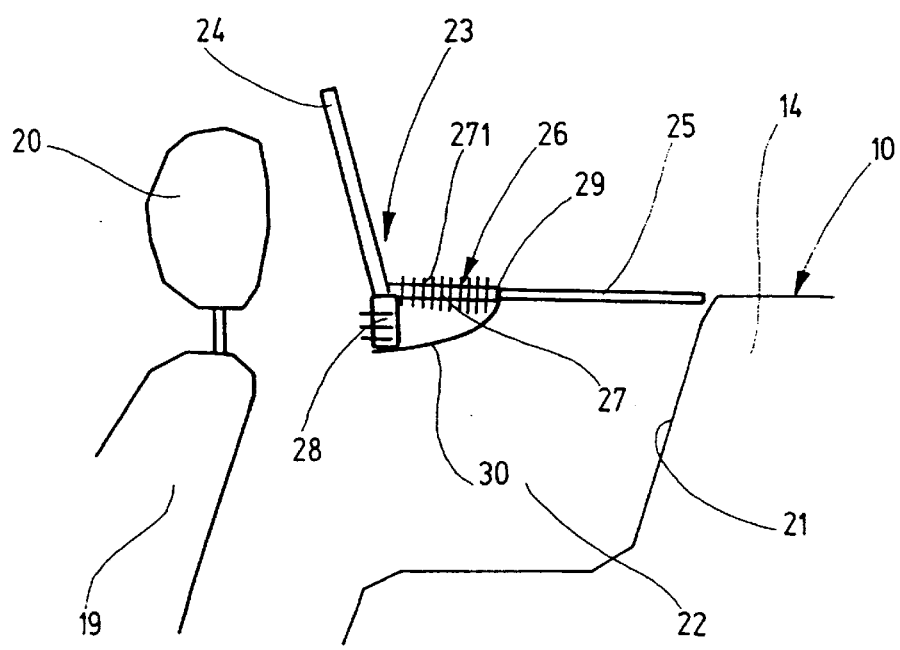
FIG. 2 is an enlarged schematic representation of the wind partition arrangement in FIG. 1 taken along intersection line II—II in FIG. 3.
Figure 3:
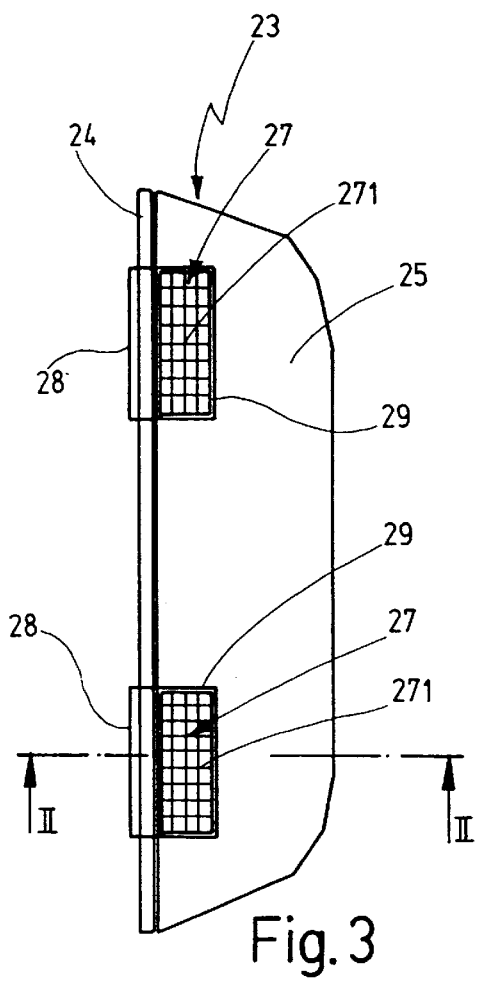
FIG. 3 is a schematic, partially sectional top view of the wind partition arrangement in FIG. 2.

In the embodiment of FIGS. 1 to 3, the covering part 25 has a plate-shaped construction and, in an assignment to one headrest 20 respectively, has two openings 29 situated close to the wind partition 24. A heat exchanger 27 is arranged in each opening 29 and covers the opening cross-section by means of its air inlet surface 271. In this case, the heat exchanger 27 is fastened on the underside of the plate-shaped covering part 25. Each of the two air outlet nozzles 28 is connected with the assigned opening 29 by way of an air guiding element 30 which leads around the heat exchanger 27, encloses the opening edge of the opening 29 and forms one piece with the covering part 25. When driving with an open top, air flows through the openings 29 arranged in the ram area, flows through the heat exchangers 27 and is guided by means of the air guiding elements 30 to the air outlet nozzles 28. There, the warmed air flows out directly in the direction of the vehicle occupants and supplies the shoulder and neck region of the vehicle occupants with warm air, whose temperature can be adjusted by way of the heating output of the heat exchangers 27.

The additional embodiments of wind partition arrangements 23 described in the following basically correspond to the described wind partition arrangement 23 and are modified only in one manner or another. For this reason, in all additional figures, only the modified constructional elements are provided with new reference numbers, while the same reference numbers as in FIGS. 1 to 4 are retained for identical constructional elements.

Figure 4:
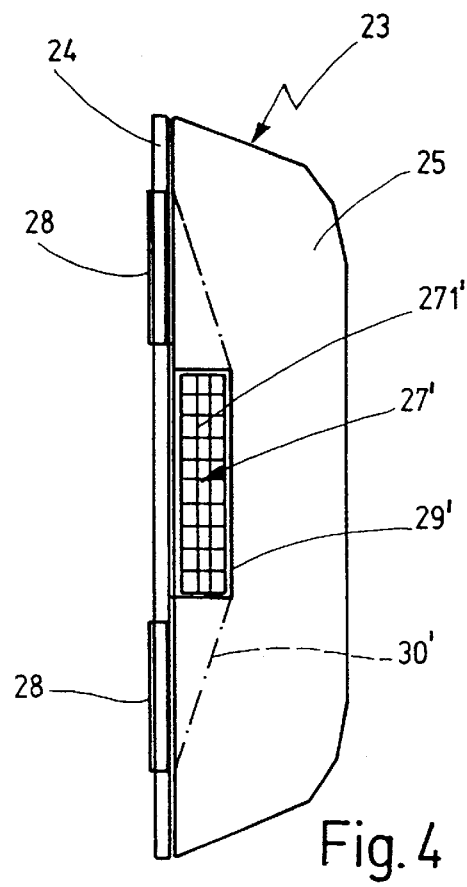
FIG. 4 is the same schematic representation as in FIG. 3 of a wind partition arrangement modified with respect to FIG. 2.

The wind partition arrangement 23 outlined in this cross-section in FIG. 4 is modified to such an extent with respect to the wind partition arrangement according to FIGS. 1 to 3 that only a single heat exchanger 27' is provided which is inserted in a central opening 29' also again close to the wind partition 24 and covers the opening cross-section of the opening 29 by means of its air inlet surface 271'. The two air outlet nozzles 28 are connected by way of an air guiding element 30' which extends around the heat exchanger 27', encloses the opening edge of the opening 29' and forms one piece with the covering part 25.

Figure 5:
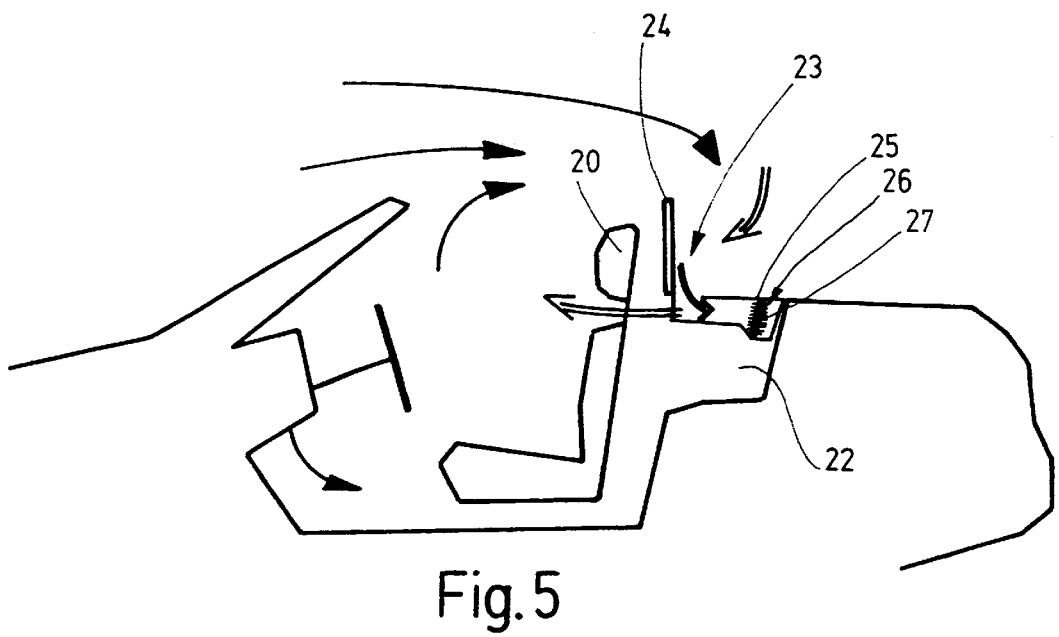
FIG. 5 is a schematic cutout-type longitudinal sectional view of a convertible with an air partition arrangement according to a second embodiment.
Figure 6:
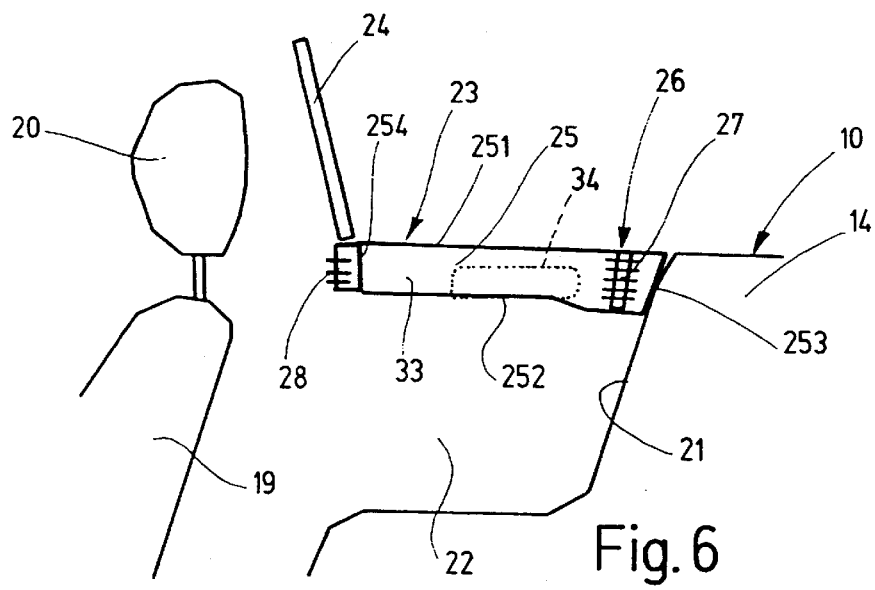
FIG. 6 is an enlarged schematic representation of the wind partition arrangement in FIG. 5 taken along intersection line VI—VI in FIG. 7.
Figure 7:
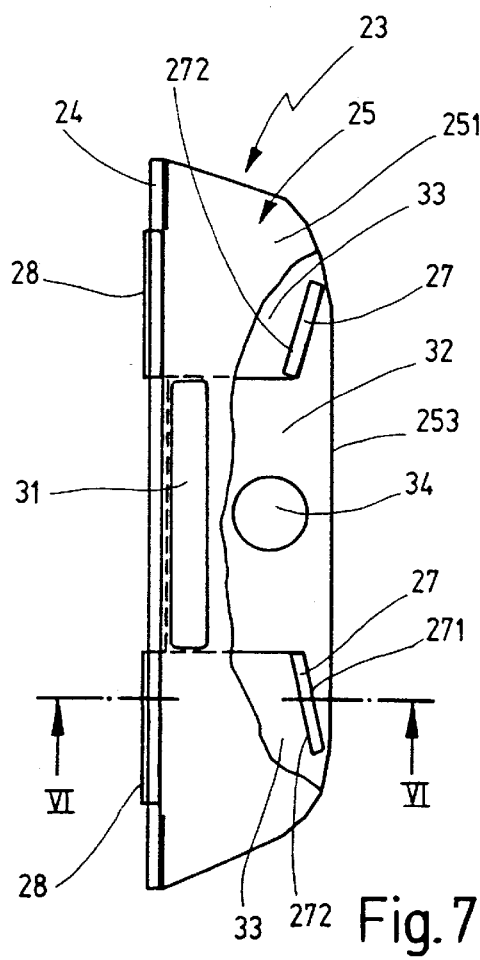
FIG. 7 is a partially sectional, schematic top view of the wind partition arrangement in FIG. 6.

In the case of the wind partition arrangement 23 which is illustrated in FIGS. 5 to 7 and covers the rear space 22 of the vehicle occupant compartment 13 in the same manner and has a wind partition 24 and a covering part 25, the covering part 25 is constructed in a box shape and, in its upper box wall 251 (FIGS. 6 and 7), has an air inlet opening 31 situated in the center between the headrests 20 close to the wind partition 24. In the box interior, a central air inlet duct 32, which starts out from the air inlet opening 31, as well as two air outlet ducts 33 arranged laterally of the air inlet duct 32 are constructed. All three ducts 32, 33 extend from the forward box wall 254 facing the wind partition 24 to the rearward box wall 253 of the box-shaped covering part 25 facing away from the wind partition 24. On the end side, the air outlet ducts 33 lead into one respectively of the two air outlet nozzles 28 held in the forward box wall 254. Close to the rearward box wall 253, two heat exchangers 27 are arranged which cover the transitions from the duct end of the air inlet duct 32 to the duct beginnings of the air outlet ducts 33. The air outlet surfaces 272 of the heat exchangers 27 cover the whole clear opening of the duct beginning of the respectively assigned two air outlet ducts 33. As illustrated in FIG. 7, a fan 34 is arranged in the air inlet duct 32 and has a blow-out opening pointing to the heat exchangers 27. Such a fan 34 promotes the warm air supply by way of the air outlet nozzles 28 when driving extremely slowly or when the motor vehicle is stopped.

Figure 8:
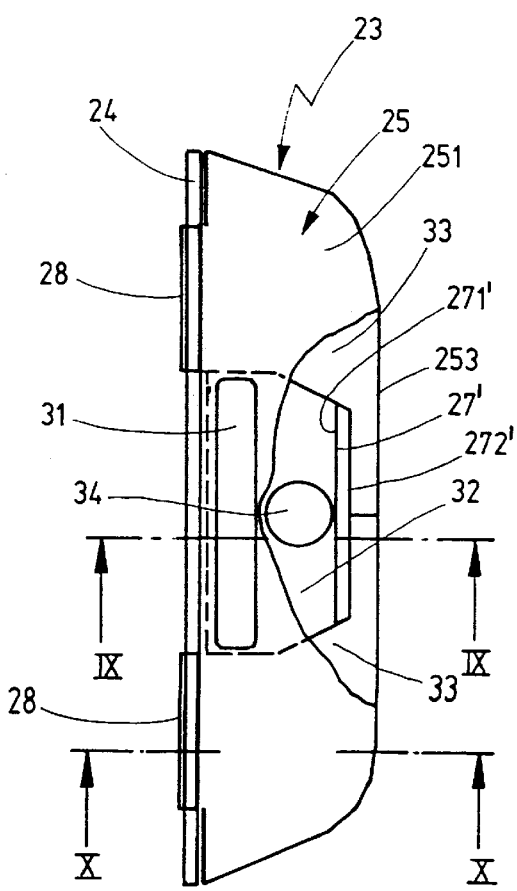
FIG. 8 is the same schematic representation as in FIG. 7 of a wind partition arrangement modified with respect to FIG. 6.
Figure 9:
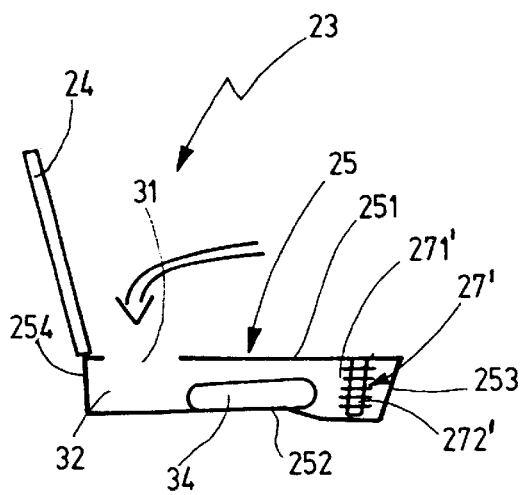
FIG. 9 is a schematic longitudinal sectional view along Line IX—IX in FIG. 8.
Figure 10:
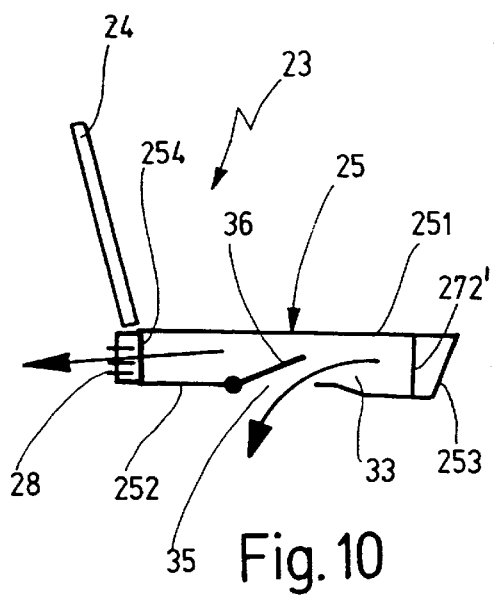
FIG. 10 is a schematic longitudinal sectional view along Line X—X in FIG. 8.

FIGS. 8 to 10 outline a wind partition arrangement 23 which is modified with respect to FIGS. 5 to 7, specifically in FIG. 8 in a partially sectional top view, and in FIGS. 9 and 10, in two sectional views as indicated in FIG. 8. In contrast to the wind partition arrangement 23 in FIGS. 5 to 7, only a single heat exchanger 27' is provided in the box-shaped covering part 25, which heat exchanger 27' is arranged close to the rearward box wall 253 of the covering part 25 at a distance from the latter. The arrangement of the heat exchanger 27' is such that the air inlet surface 271' of the heat exchanger 27' covers the clear opening of the duct end of the air inlet duct 32, and half of the outlet surface 272' respectively of the heat exchanger 27' covers the clear opening of the duct beginning of each air outlet duct 31. FIG. 9 shows the air inlet duct 32 as a sectional view, which air inlet duct 32 is connected, at its end facing the wind partition 24, with the air inlet opening 31 and is closed off by the heat exchanger 27' at its end facing away from the wind partition 24. In the sectional view of FIG. 10, an air outlet duct 33 is visible as a sectional view, which leads into the air outlet nozzle 28 below the wind partition 24. In the lower box wall 252 of the covering part 25, a blow-out opening 35 is arranged in the area of each air outlet duct 33, which blow-out opening 35 can optionally be closed or opened by means of an air flap 36. By way of this air flap 36, the rear space 22 can be supplied with warm air. In this case, the air flap 36 is constructed as a scooping flap which, from the air quantity flowing to the air outlet nozzle 28, branches off a partial quantity into the rear space 22. When the air flap 36 is maximally opened up, the air flow to the air outlet nozzle 28 is blocked.

The embodiments of a wind partition arrangement 23 illustrated in FIGS. 11 to 20 have in common that the heat exchanger 27' or the two heat exchangers 27 are not arranged in the covering part 25 but in a separate housing module 37.

Apart from the absent heat exchangers 27 or 27', the box-shaped covering part 25 has the same construction as described above with respect to FIGS. 5 to 7 and 8 to 10. Thus, the air inlet duct 32 connected with the air inlet opening 31 as well as the two side-by-side air outlet ducts 33 with their air outlet nozzles 28 are constructed again in the covering part 25. The air inlet duct 32 ends in a connection opening 38 arranged in the center in the rearward box wall 253, and the two air outlet ducts 33 are connected by means of their duct beginning to one connection opening 39 in the rearward box wall 253 respectively situated on the left and on the right of the central connection opening 39. The rearward box wall 253 of the box-shaped covering part 25 having the three connection openings 38, 39 covers the open front of the housing module 37 facing the covering part 25. The two heat exchangers 27 are placed in the housing module 37 such that, in each case, the air outlet surfaces 272 of the two heat exchangers 27 cover the two connection openings 39 in the box wall 253.

The wind partition arrangement 32 in FIG. 14 is modified such with respect to FIG. 13 that, instead of the two heat exchangers 27, only a single heat exchanger 27' exists which, by means of its air inlet surface 271', covers the connection opening 38 to the central air inlet duct 32. Here also, the rearward box wall 253 of the covering part 25 covers the open front of the housing module 37.

Figure 11:
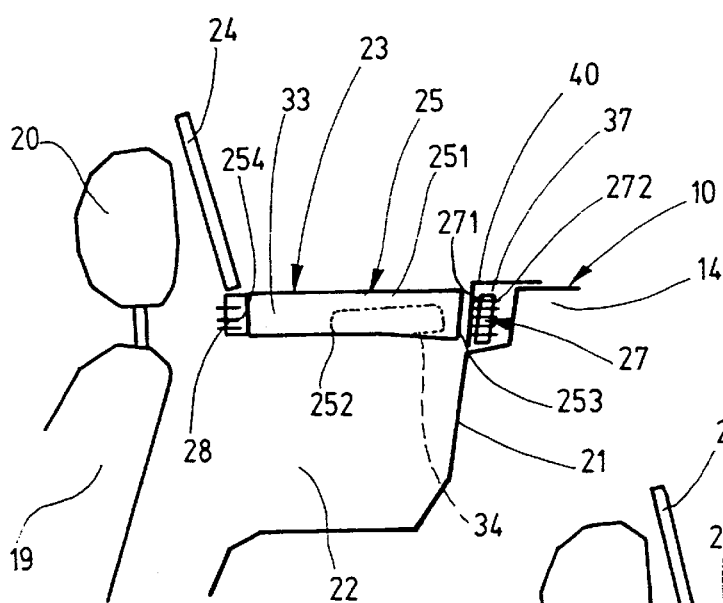
FIG. 11 is an enlarged schematic representation of a wind partition arrangement taken along intersection line XI—XI in FIG. 13 according to a third embodiment.
Figure 12:
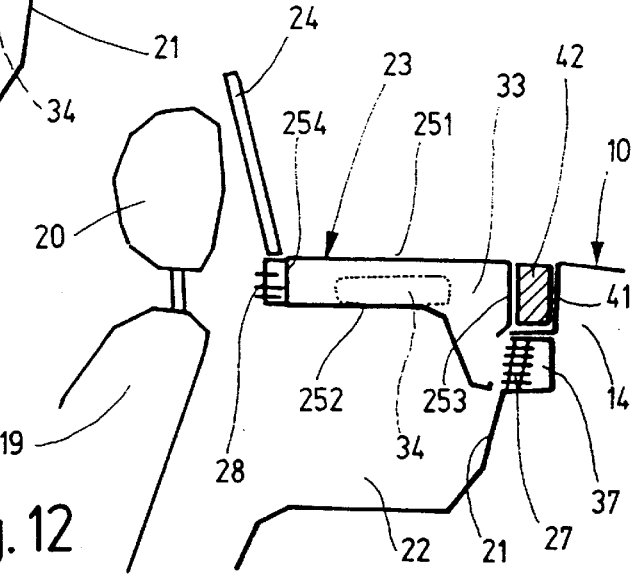
FIG. 12 is the same schematic representation as in FIG. 11 with a wind partition arrangement modified with respect to FIG. 11.
Figure 17:
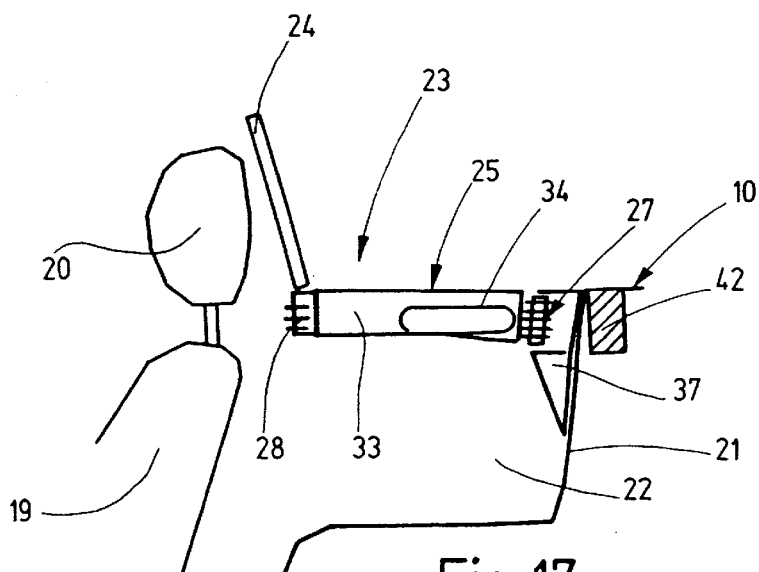
FIG. 17 is a schematic sectional view of a wind partition arrangement according to Line XVII—XVII in FIG. 18 according to a fourth embodiment.
Figure 18:
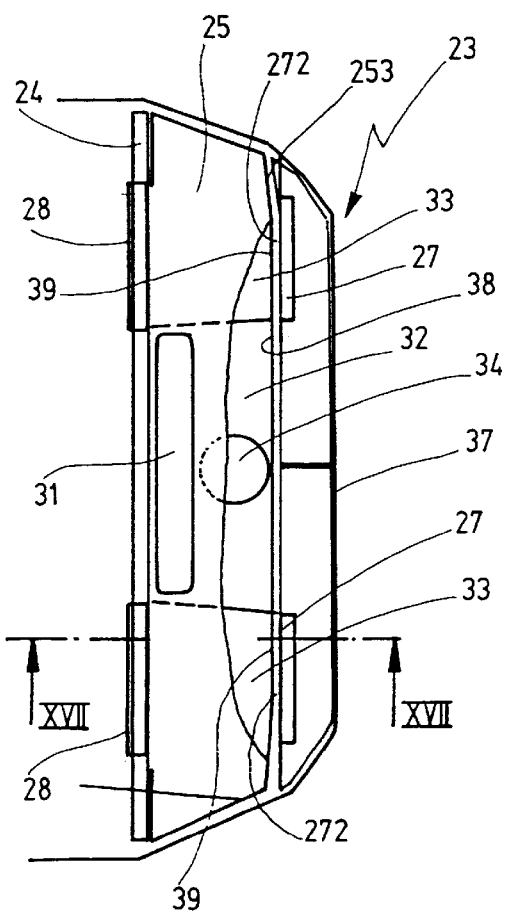
FIG. 18 is a partially sectional schematic top view of the wind partition arrangement in FIG. 17.

In the embodiments according to FIGS. 11 and 13, 14 and 15 as well as FIGS. 12, 16, the housing module 37 is in each case an integral component of the rear wall of the vehicle occupant compartment 13. In order to cover the heat exchangers 27 and 27' when the wind partition arrangement 23 is demounted, the front of the housing module 37 shaped out in the rear wall 21 may be covered by means of a screen 40 (FIG. 11). In these cases, the screen 40 has connection openings which are congruent with the connections openings 38 and 39 in the rearward box wall 253 of the covering part 25 and which, when the wind partition arrangement 23 is mounted, correspond with the connection openings 38, 39.

In the embodiments of the wind partition arrangement 23 according to FIGS. 12 and 16, the housing module 37 formed by the rear wall 21 of the vehicle occupant compartment 13 is in each case situated below a recess 41 which is constructed in the vehicle body 10, is open toward the top side and extends transversely over the vehicle body 10 and is used for receiving a rollover bar 42 which can be swivelled away.

FIGS. 15 and 16 each show the same representation as FIGS. 11 and 12, specifically for the modified wind partition arrangement 23 with only one heat exchanger 27' in the housing module 37, in which case, in FIG. 16, the housing module 37 shaped out in the rear wall 21 of the vehicle occupant compartment 13 is again arranged below the recess 41 for the rollover bar 42.

In contrast to the embodiments according to FIGS. 11 to 16, in the embodiments according to FIGS. 17 to 20, the housing module 37 is not an integral component of the rear wall 21 of the vehicle occupant compartment 13 but a separate component which is arranged in the rear space 22 and is fastened to the rear wall 21 of the vehicle occupant compartment 13. Also, the embodiment according to FIGS. 17 and 18 corresponds to the embodiment of FIGS. 11 and 13; and the embodiment according to FIGS. 19 and 20 corresponds to the embodiment according to FIGS. 14 and 15.

In the embodiments of a wind partition arrangement 23 illustrated in FIGS. 21 to 23, the box-shaped covering part 25 is an integral component of a multifunction box 43 which fills the rear space 22 and which, in the illustrated embodiment, has two depositing compartments 44, 45 which are accessible from the front of the box 43 facing away from the rear wall 21. The box-shaped covering part 25 is connected in one piece with the depositing compartments 44, 45 and has the above-described characteristics, such as the air guiding ducts 32, 33 constructed in the covering part 25, of which an air outlet duct 33 is visible, as well as the fan 34 arranged in the air inlet duct 32 and the blow-out opening 35 with the air flap 36 arranged in each air outlet duct 33. The multifunction box 43 is adapted to the contour of the rear space 22 so that it fills it completely. In FIGS. 21 and 22, the housing module 37 accommodating the heat exchanger 27 is an integral component of the rear wall 21 of the vehicle occupant compartment 13, in which case, in FIG. 22, the housing module 37 is arranged below the recess 41 for the rollover bar 42. In FIG. 23, the housing module 37 is fastened as a separate component on the rear wall 21 of the vehicle occupant compartment 13.

Figure 19:
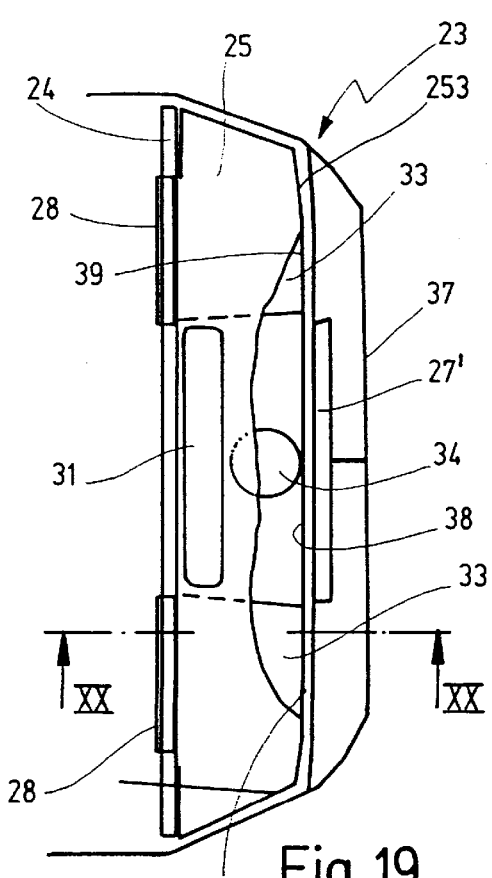
FIG. 19 is the same schematic representation as in FIG. 18 of a wind partition arrangement modified with respect to FIG. 17.

In the embodiments outlined in FIGS. 24 and 25, on the one hand, and in FIGS. 26 and 27, on the other hand, in a central longitudinal sectional view of the air inlet duct 32 (FIGS. 24 and 26) and a sectional view along Line XX—XX in FIG. 19 of the air outlet duct 33 of the covering part 25 (FIGS. 25 and 27), in addition to the heat exchanger 27', the fan 46 is also integrated in the housing module 37, in which case the housing module 37, as in the embodiment according to FIGS. 19 and 20, is arranged in the rear space 22 and is fastened to the rear wall 21 of the vehicle occupant compartment 13. The fan 46 constructed as a radial-flow fan has an axial intake opening 47 and a tangential blow-out opening facing the air inlet surface of the heat exchanger 27'. The fan wheel of the fan 46 is schematically illustrated in FIGS. 24 and 26. The heat exchanger 27' is arranged below the fan 46 and, by means of its air inlet surface 271', covers the end of a central duct 48 constructed in the housing module 37 and, by means of its air outlet surface 272', covers the end of two side ducts 49 which extend laterally of the central duct 48 and are separated from one another by the central duct 48 and a central separating wall 50. When the covering part 25 joined to the housing module 37, the other end of the central duct 48 is connected to the connection opening 38 in the rearward duct wall 253, and the other ends of the two side ducts 49 are connected to the connection openings 39 in the rearward box wall 253 of the covering part 25, so that the central duct 48 is connected with the air inlet duct 32 and the side ducts 49 are connected with the two air outlet ducts 33.

The fan 46 is arranged in the central duct 48, and its intake opening 47 and fan outlet are formed by air guiding elements arranged in the central duct 48. In the embodiment according to FIGS. 24 and 25, these are constructed such that the intake opening 47 is connected with the central duct 48, and the fan 46, on the delivery side, only acts upon a partial area of the air inlet surface 271' of the head exchanger 27', so that the ram air flowing into the air inlet duct 32 during the drive by way of the air inlet opening 31 flows through the remaining area of the air inlet surface 271' and additionally by way of the intake opening 47 through the fan 46.

In the embodiment according to FIGS. 26 and 27, the air guiding elements are arranged such that the intake opening 47 is again connected with the central duct 48, but, on the delivery side, the fan 46 covers the whole air inlet surface 271' of the head exchanger 27'. On the suction side, the entire suction air now enters by way of the intake opening 47 into the fan 46. The higher ram resistance can be compensated by a fan 46 of a slightly higher capacity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wind partition arrangement for two-seat, open motor vehicles, such as roadsters or convertibles, having vehicle seats accommodated in a vehicle occupant compartment and arranged side-by-side, each seat having a backrest and a headrest arranged above the backrest, said wind partition arrangement comprising:

an essentially vertically aligned wind partition which covers the headrest area behind the backrests, an essentially horizontally aligned covering part which covers a clearance between the wind partition and a rear wall of the vehicle occupant compartment, and a heating device which has at least one heat exchanger through which at least a portion of the air can flow which reaches the headrest area, wherein the covering part has a function element for guiding air which is connected with the heat exchanger, and has two air outlet nozzles assigned to one vehicle seat respectively, which air outlet nozzles are arranged with an air outflow direction pointing to the headrests, directly below the wind partition.

2. Arrangement according to claim 1, wherein the covering part has a plate-shaped construction and, in an assignment to one headrest respectively, has two openings situated close to the wind partition, wherein a heat exchanger is arranged in each opening, which heat exchanger covers the opening cross-section by means of its air inlet surface, wherein each air outlet nozzle is connected with the assigned opening by way of an air guiding element which encloses the opening edge and preferably forms one piece with the covering part.

3. Arrangement according to claim 1, wherein the covering part has a plate-shaped construction and an opening in the center between the headrests close to the wind partition, wherein a heat exchanger is arranged in the opening, which heat exchanger covers the opening cross-section by means of its air inlet surface, and wherein the two air outlet nozzles are connected with the opening by way of an air guiding element which encloses the opening edge and preferably forms one piece with the covering part.

4. Arrangement according to claim 1, wherein the covering part has a box-shaped construction and, in its upper box wall, has an air inlet opening placed in the center between the headrests close to the wind partition, and wherein, in the box interior, an air inlet duct leading to the air inlet surface of the at least one heat exchanger and two air outlet ducts are constructed which each laterally adjoin the air inlet duct and lead from the air outlet surface of the at least one heat exchanger to one of the air outlet nozzles respectively.

5. Arrangement according to claim 4, wherein a radial-flow fan, which has a blow-out opening directed to the heat exchanger is arranged on the air inlet duct.

6. Arrangement according to claim 4, wherein in the lower box wall of the box-shaped covering part, at least one blow-out opening is arranged which leads into an air outlet duct and which can be closed by means of an air flap.

7. Arrangement according to claim 5, wherein in the lower box wall of the box-shaped covering part, at least one blow-out opening is arranged which leads into an air outlet duct and which can be closed by means of an air flap.

8. Arrangement according to claim 4, wherein the at least one heat exchanger is arranged in the box interior close to the rearward box wall facing away from the air outlet nozzles.

9. Arrangement according to claim 5, wherein the at least one heat exchanger is arranged in the box interior close to the rearward box wall facing away from the air outlet nozzles.

10. Arrangement according to claim 6, wherein the at least one heat exchanger is arranged in the box interior close to the rearward box wall facing away from the air outlet nozzles.

11. Arrangement according to claim 8, wherein a single heat exchanger is arranged in the box interior such that the air inlet surface of the heat exchanger covers the clear opening of the duct end of the air inlet duct, and half of the air outlet surface of the heat exchanger respectively covers the clear opening of the duct beginning of each air outlet duct.

12. Arrangement according to claim 8, wherein two heat exchangers are arranged in the box interior such that the air outlet surfaces of the two heat exchangers cover the clear opening of the duct beginning of one of the two outlet ducts respectively.

13. Arrangement according to claim 4, wherein the box-shaped covering part has in its rearward box wall facing away from the wind partition, a central connection opening which forms a duct end of the air inlet duct, and two connection openings, which each form a duct beginning of the air outlet ducts and are in each case arranged laterally next to the central connection opening, and wherein the at least one heat exchanger is arranged in a housing module which is separated from the covering part and whose open front facing a covering part is closed off by a rearward box wall of the covering part facing away from the wind partition.

14. Arrangement according to claim 13, wherein a fan is arranged in the housing module, in the air flow direction, in front of the heat exchanger.

15. Arrangement according to claim 14, wherein in the housing module, a central duct is constructed which continues from the central connection opening of the rearward box wall of the housing module, and two side ducts are constructed, which extend laterally to this central duct and are connected to one lateral connection opening respectively in the rearward box wall of the housing module, and wherein the heat exchanger, by means of its air inlet surface, completely covers the central duct and, by means of its air outlet surface, completely covers the two side ducts.

16. Arrangement according to claim 15, wherein the fan has an intake opening which leads into the central duct and, on the delivery side, completely or partially acts upon the air inlet surface of the heat exchanger.

17. Arrangement according to claim 16, wherein the fan is arranged in the central duct, and wherein the intake opening of the fan and the fan outlet are formed by air guiding elements arranged in the central duct.

18. Arrangement according to claim 13, wherein the housing module is an integral component of the rear wall of the vehicle occupant compartment.

19. Arrangement according to claim 14, wherein the housing module is an integral component of the rear wall of the vehicle occupant compartment.

20. Arrangement according to claim 15, wherein the housing module is an integral component of the rear wall of the vehicle occupant compartment.

21. Arrangement according to one of claim 13, wherein the housing module is arranged in the vehicle occupant compartment and is fastened to the rear wall of the vehicle occupant compartment.

22. Arrangement according to claim 14, wherein the housing module is arranged in the vehicle occupant compartment and is fastened to the rear wall of the vehicle occupant compartment.

23. Arrangement according to claim 15, wherein the housing module is arranged in the vehicle occupant compartment and is fastened to the rear wall of the vehicle occupant compartment.

24. Arrangement according to claim 16, wherein the housing module is arranged in the vehicle occupant compartment and is fastened to the rear wall of the vehicle occupant compartment.

25. Arrangement according to claim 17, wherein the housing module is arranged in the vehicle occupant compartment and is fastened to the rear wall of the vehicle occupant compartment.

26. Arrangement according to claim 4, wherein the box-shaped covering part is an integral component of a multifunction box filling the clearance in front of the rear wall of the vehicle occupant compartment.

27. Arrangement according to claim 13, wherein the box-shaped covering part is an integral component of a multifunction box filling the clearance in front of the rear wall of the vehicle occupant compartment.

28. Arrangement according to claim 26, wherein in that the outer contour of the multifunction box is adapted to the rear space of the vehicle occupant compartment.

29. Arrangement according to claim 27, wherein in that the outer contour of the multifunction box is adapted to the rear space of the vehicle occupant compartment.

30. Arrangement according to claim 26, wherein the multifunction box has depositing compartments.

31. Arrangement according to claim 28, wherein the multifunction box has depositing compartments.

32. A wind partition arrangement for an open motor vehicle with a vehicle occupant compartment having a pair of seats with backrests and headrests, said seat being disposed in front of an occupant compartment transverse wall, said wind partition arrangement comprising:

a vertically extending wind partition which in use extends behind the seat headrests, a horizontally extending cover which in use covers a clearance between the wind partition and the transverse wall, and a heating device having at least one heat exchanger through which flows at least a portion of air flowing toward the headrests during use in an open vehicle, wherein said cover includes means for guiding air from the at least one heat exchanger to air outlet nozzle means opening in use toward the headrests under the wind partition.

33. An open convertible motor vehicle comprising:

a vehicle occupant compartment, a pair of seats with backrests and headrests disposed side by side in front of a transverse wall of the occupant compartment, and a wind conditioning arrangement, said wind conditioning arrangement including:

a vertically extending wind partition which in use extends behind the seat headrests, a horizontally extending cover which in use covers a clearance between the wind partition and the transverse wall, and a heating device having at least one heat exchanger through which flows at least a portion of air flowing toward the headrests during use in an open vehicle, wherein said cover includes means for guiding air from the at least one heat exchanger to air outlet nozzle means opening in use toward the headrests under the wind partition.

* * * * *